T. N. MOORE.
VEHICLE BRAKE.
APPLICATION FILED APR. 4, 1912.
1,037,291.
Patented Sept. 3, 1912.
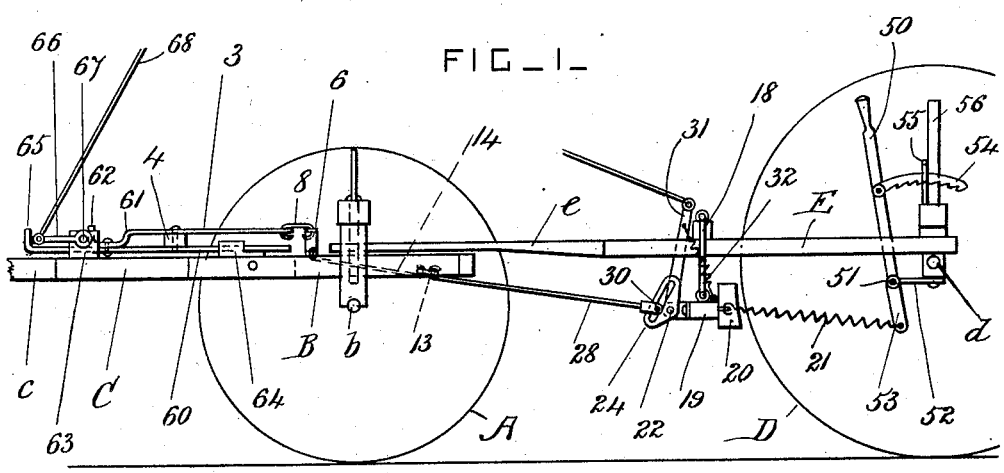
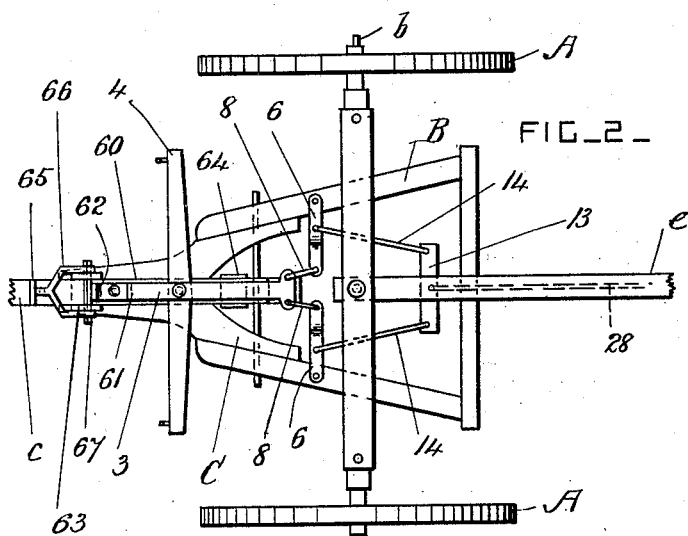
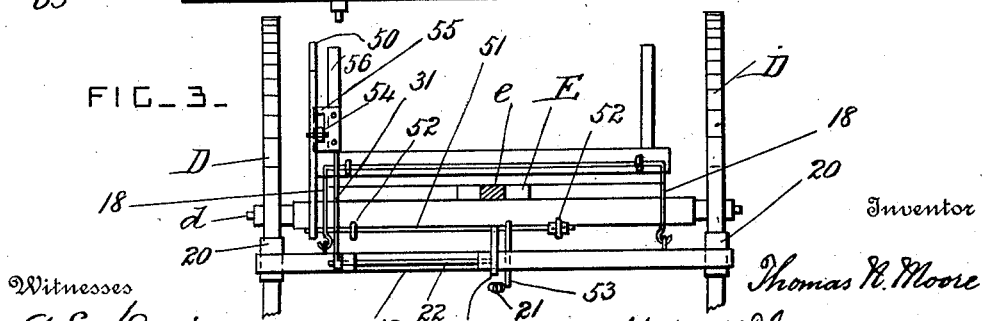
Witnesses
A. E. Davis.
W. Allen
Inventor
Thomas N. Moore
By Herbert W. T. Jenner.
Attorney

UNITED STATES PATENT OFFICE.

THOMAS NOWEL MOORE, OF COLEMAN, OKLAHOMA.

VEHICLE-BRAKE.

1,037,291. Specification of Letters Patent. Patented Sept. 3, 1912.

Application filed April 4, 1912. Serial No. 688,460.

*To all whom it may concern:*

Be it known that I, THOMAS N. MOORE, a citizen of the United States, residing at Coleman, in the county of Johnston and State of Oklahoma, have invented certain new and useful Improvements in Vehicle-Brakes; and I do hereby declare the following to be a full, clear, and exact description of the invention, such as will enable others skilled in the art to which it appertains to make and use the same.

This invention relates to brakes for wagons and other similar vehicles; and it consists in the novel construction and combination of the parts hereinafter fully described and claimed.

In the drawings, Figure 1 is a side view of a wagon having a brake constructed according to this invention. Fig. 2 is a plan view of a portion of the draft tongue and the parts carried by it. Fig. 3 is a front view of the lever mechanism between the brake spring and the rear axle.

This invention consists in certain improvements in the brake for which a patent has been issued to me on March 5, 1912, No. 1,019,176. The principal parts are similar to those shown and described in the patent. The front road wheels A are mounted on a front axle $b$ carried by a front frame B. C are the hounds provided with a draft tongue or pole $c$. D are the rear wheels mounted on a rear axle $d$ carried by the rear frame E, and $e$ is the reach connecting the two frames. A slide bar 3 is arranged over the pole $c$, and its rear end is connected to the brake releasing rod 28 by suitable intermediate connections 6, 8, 13 and 14, as shown and described in the said patent. The brake beam 19 is suspended from the rear frame by rods 18, and has brake blocks 20 for engaging with the rear wheels. A rock-shaft 22 is supported from the brake beam, and has a link or slotted plate 24 secured to it, and also an arm 31. The rod 28 is connected with the link 24 by a pin 30, and 21 is a spring which normally presses the brake blocks on the rear wheels. A whiffletree 4 is connected to the slide bar 3, and when the parts are in the positions shown in Fig. 1, and the team pulls on the whiffletree and the slide rod, the brake is released. When the link is turned downwardly and forwardly, the pin slides in its slot, and the brake is not released, or, if previously released, it is re-applied by the spring. A spring 32 normally holds the link with the lower end of its slot slightly in advance of its upper end. All of the above-mentioned parts are similar to those shown and described in the said patent.

In order to adapt the brake to the load, instead of securing the brake spring 21 to the rear axle $d$, a lever 50 is provided and is secured to a rock-shaft 51 mounted in bearings 52 secured to the axle. The spring 21 is secured to an arm 53 on this rock-shaft, and the lever is provided with a pivoted toothed rack 54, which engages with a detent plate 55, which is secured to the standard 56 on the rear frame above the rear axle and bolster. The tension of the brake spring is adjusted by means of this lever and its catch mechanism so as to suit different loads.

Locking devices are provided for securing the slide bar 3. The whiffletree 4 is pivoted between the slide bar 3 and a guide bar 60, and the front end portion of the slide bar 3 has a cranked portion 61 which is riveted to the guide bar and provided with a stop 62. The guide bar 60 slides longitudinally in guide brackets 63 and 64 secured to the draft pole, and the guide bar is arranged parallel to the slide bar. The front end of the guide bar is provided with a stop 65.

A bail 66 is pivoted to the front bracket 63 by a pin 67. This bail normally rests on the front stop 65, and the slide bar is free to slide longitudinally. When the slide bar is pulled forwardly by the team to its full extent, the bail drops by gravity into the space between the two stops and prevents the return movement of the slide bar.

A rod 68, or other suitable connection, is pivoted to the bail so as to afford a means for raising it from a distance, and thereby unlocking the slide bar. The rear stop 64 engages with the pin 67 when the slide bar is pulled forwardly to its full extent, and thereby limits the forward movement of the slide bar.

What I claim is:

1. The combination with a wheeled vehicle provided with a draft pole, a spring-pressed brake normally bearing on the wheels, and a brake releasing rod operatively connected with the said brake; of a slidable guide bar and a slide bar secured together and arranged parallel to each other and provided with two stops on their respective front end portions, guide brackets for the guide bar to slide in secured to the said draft pole, a bail for locking the said slide bar, said bail being pivotally supported by the draft pole and arranged between the said stops, intermediate connections between the slide bar and the brake releasing rod, and a whiffletree pivoted between the slide bar and the guide bar.

2. The combination, with a wheeled vehicle provided with a draft pole, a spring-pressed brake normally bearing on the wheels, and a brake releasing rod operatively connected with the said brake; of a slidable guide bar and a slide bar arranged parallel to each other, the front end portion of the slide bar being provided with a cranked portion which is secured to the guide bar and provided with a rear stop, and the front end of the guide bar being provided with a front stop, a front guide bracket secured to the draft pole and engaging with the guide bar, a pin carried by the front guide bracket and engaging with the rear stop, a bail pivoted on the said pin and engaging with the front stop, a rear guide bracket, for the guide bar, secured to the said draft pole, a whiffletree pivoted to the said bars and arranged between the said guide brackets, and intermediate connections between the said slide bar and the brake releasing rod.

In testimony whereof I have affixed my signature in the presence of two witnesses.

THOMAS NOWEL MOORE.

Witnesses:
GEO. E. HOUCK,
ALDINE AIRINGTON.

---

Copies of this patent may be obtained for five cents each, by addressing the "Commissioner of Patents, Washington, D. C."